(12) United States Patent
Ito

(10) Patent No.: US 7,808,306 B2
(45) Date of Patent: Oct. 5, 2010

(54) POWER SUPPLY VOLTAGE CONTROL APPARATUS

(75) Inventor: Minoru Ito, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/360,475

(22) Filed: Jan. 27, 2009

(65) Prior Publication Data

US 2009/0128118 A1    May 21, 2009

Related U.S. Application Data

(63) Continuation of application No. 11/553,145, filed on Oct. 26, 2006, now Pat. No. 7,501,868.

(30) Foreign Application Priority Data

Oct. 27, 2005    (JP) .............................. 2005-312811

(51) Int. Cl.
*G05F 1/10* (2006.01)
(52) U.S. Cl. .................. 327/540; 327/158; 327/538
(58) Field of Classification Search ................. 327/158, 327/538, 540
See application file for complete search history.

(56) References Cited

U.S. PATENT DOCUMENTS

| | | | |
|---|---|---|---|
| 5,334,952 A | 8/1994 | Maddy et al. | |
| 5,757,238 A | 5/1998 | Ferraiolo et al. | |
| 5,914,631 A | 6/1999 | Soneda | |
| 6,075,397 A | 6/2000 | Yamada | |
| 6,414,527 B1 | 7/2002 | Seno et al. | |
| 6,417,738 B1 * | 7/2002 | Lautzenhiser | 331/17 |
| 6,667,651 B2 * | 12/2003 | Hashiguchi | 327/538 |
| 6,924,679 B2 | 8/2005 | Seno et al. | |

(Continued)

FOREIGN PATENT DOCUMENTS

JP    9-285109    10/1997

(Continued)

OTHER PUBLICATIONS

English language Abstract of JP 9-285109, Oct. 31, 1997.

(Continued)

*Primary Examiner*—Lincoln Donovan
*Assistant Examiner*—Ryan C Jager
(74) *Attorney, Agent, or Firm*—Greenblum & Bernstein P.L.C.

(57) ABSTRACT

A power supply voltage control apparatus capable of freely setting a clock period setting margin according to a system clock frequency, and capable of converging power supply voltage to minimum power supply voltage where normal operation is possible in a short period of time without errors in operation of internal circuits in response to changes in the system clock frequency is provided. Power supply voltage control apparatus is provided with a first frequency-divider that frequency-divides the system clock at a first frequency-diving ratio, a second frequency-divider that frequency-divides an output of a voltage control oscillator at a second frequency-dividing ratio, a phase comparator/frequency comparator that carries out a phase comparison/frequency comparison on the respective output signals of the first and second frequency-dividers, and a controller. Frequency-dividing ratios of the first and second frequency-divider are set by a second controller according to an operation mode signal corresponding to the system clock frequency.

5 Claims, 13 Drawing Sheets

U.S. PATENT DOCUMENTS

| | | | |
|---|---|---|---|
| 7,501,868 B2 * | 3/2009 | Ito | 327/158 |
| 2005/0062507 A1 | 3/2005 | Naffziger et al. | |
| 2006/0158263 A1 | 7/2006 | Goldberg | |

FOREIGN PATENT DOCUMENTS

| | | |
|---|---|---|
| JP | 10-49242 | 2/1998 |
| JP | 2000-216337 | 8/2000 |
| JP | 2002-100967 | 4/2002 |

OTHER PUBLICATIONS

English language Abstract of JP 10-49242, Feb. 20, 1998.
English language Abstract of JP 2002-100967, Apr. 5, 2002.
English language Abstract of JP 2000-216337, Aug. 4, 2000.

* cited by examiner

POWER SUPPLY VOLTAGE CONTROL APPARATUS

CROSS-REFERENCE TO RELATED APPLICATION

This application is a continuation of pending U.S. patent application Ser. No. 11/553,145, filed Oct. 26, 2006, the disclosure of which is expressly incorporated herein by reference in its entirety.

This application claims priority of Japanese Patent Application No. 2005-312811, filed Oct. 27, 2005, the disclosure of which is expressly incorporated by reference herein.

BACKGROUND OF THE INVENTION

1. Field of the Invention

The present invention relates to a power supply voltage control apparatus that controls power supply voltage of a semiconductor integrated circuit apparatus such as an LSI (Large Scale Integration).

2. Description of the Related Art

In recent years, as important methods for reducing power consumption of the semiconductor integrated circuit, methods of changing power supply voltage according to clock frequencies are well-known. However, when the accuracy of power supply voltage setting is coarse, or, when a power supply voltage setting circuit is temperature dependant, errors in circuit operation may occur as a result of timing errors by reducing power supply voltage too low. Further, there are also cases where timing errors may occur as a result of decrease of the driving performance of a MOS transistor due to temperature fluctuation, and may lead to errors in circuit operation.

With regards to this problem, conventionally, a voltage generating circuit technology is disclosed that is capable of generation the minimum required operation power supply voltage in a predetermined clock frequency.

For example, as shown in FIG. 10, Patent Document 1 (Japanese Patent Application Laid-Open No. Hei. 9-285109) discloses a semiconductor apparatus having: a logic circuit that operates using first power supply voltage; a voltage control oscillator section that generates a clock signal of a frequency corresponding to second power supply voltage; a phase comparator that compares phases of the clock signal and a reference clock signal; a low pass filter section that smoothes an input signal using an integrating circuit; a charge pump section that charges and discharges the lowpass filter section using the result of the phase comparison; and an internal power supply voltage generating section that generates the first power supply voltage of a level corresponding to output of the low pass filter section, wherein the first and second power supply voltages causing the logic circuit and the clock generating section to operate are shared and supplied from the power supply voltage generating section.

Further, as shown in FIG. 11, Patent Document 2 (Japanese Patent Application Laid-Open No. Hei. 10-49242) discloses, in place of the voltage control oscillator section of Patent Document 1, a power supply generating circuit that performs phase comparison between a clock signal subjected to gate delay at a voltage control delay circuit and an original clock signal, generates a voltage signal using an integrator and a buffer, feeds this back to the voltage control delay circuit as operating power supply voltage, and generates internal power supply voltage using the buffer and PchMOS transistor.

Further, as shown in FIG. 12, in order to provide versatility to the voltage control delay circuit having various delay values in Patent Document 2, Patent Document 3 (Japanese Patent Application Laid-Open No. 2002-100967) discloses a power supply voltage control apparatus provided with an input signal generating circuit that is capable of changing, upon generation of a reference signal inputted from a clock signal to a delay detection circuit and an input signal inputted to a voltage control delay circuit, a phase difference between both signals according to a control signal.

Moreover, as shown in FIG. 13, Patent Document 4 (Japanese Patent Application Laid-Open No. 2000-216337) discloses a power supply voltage control apparatus having: a semiconductor circuit; a replica circuit that monitors delay time of a critical path of the semiconductor circuit; a control circuit that sets a level control signal so that an initial value of power supply voltage becomes a minimum limit power supply voltage value where the semiconductor circuit is capable of operating properly, and setting the level control signal after start-up so as to obtain the power supply voltage value based on a monitor apparatus of the replica circuit; and a power supply voltage generating circuit that generates a power supply voltage according to the level control signal and supplying the voltage to the semiconductor circuit and replica circuit, and thereby enabling convergence time and stable operation upon start up of the power supply.

However, the conventional power supply voltage control apparatuses have the following problems.

The apparatus disclosed in Patent Document 1 sets a period of the reference clock signal inputted to the phase comparator as, for example, one period of the system clock signal. Further, the voltage control oscillator circuit is configured with a fixed number of stages of inverter circuits and critical path replicas, and therefore the period of the clock signal outputted from the voltage control oscillator circuit is equal to the period of the reference clock signal regardless of the frequency of the reference clock signal.

Similarly, the apparatuses disclosed in Patent Documents 2 and 4 set a period of the reference clock signal inputted to the phase comparator as, for example, one period of the system clock signal as with Patent Document 1. Further, the voltage control delay circuit is configured with a fixed number of stages of inverter circuits, and therefore a delay value generated by the voltage control delay circuit is equal to one period of the reference clock signal regardless of the frequency of the reference clock signal.

However, the power supply voltage control circuit takes a certain amount of time from when the power supply voltage is applied and a lag of phase or frequency between the clock output signal of the voltage control oscillator circuit and the reference clock signal is detected till when control actually operates and corrected power supply voltage is applied, and therefore the power supply voltage fluctuates. Moreover, the fluctuation value of the power supply voltage is substantially fixed regardless of the level of the power supply voltage. Therefore, fluctuation values of a maximum system clock frequency where normal operation is possible at the internal circuit with respect to the fluctuation value of the supply power voltage when the supply voltage is small and a clock frequency of the voltage control oscillator circuit, are larger than a fluctuation value of the respective clock frequencies with respect to the fluctuation value of the power supply voltage when the power supply voltage is large.

The reason for this is that the respective clock frequencies are substantially decided by the driving performance of the MOS transistor—the drain current—, and proportional to the square of a value in which the threshold voltage is subtracted from the gate voltage as expressed by the following equation.

$$I_{DS} = \alpha (V_{GS} - V_t)^2 \quad (1)$$

For example, when MOS transistor threshold voltage is 0.5V and a power supply voltage fluctuation value is 0.05V, drain current ratio is 1.07 times between power supply voltages of 2.0V and 2.05V, but between power supply voltages of 1.0V and 1.05V, the drain current ratio becomes 1.21 times.

Therefore, the first problem is that, though it is necessary to change a setting margin of a period of a clock signal outputted from the voltage control oscillator circuit or a delay value generated by the voltage control delay circuit and a period of the reference clock signal with respect to the minimum power supply voltage corresponding to the system clock frequency, Patent Documents 1, 2 and 4 cannot be compatible with this, since the setting margin is fixed.

Further, the apparatus of Patent Document 3 incorporates an input signal generating circuit capable of, when the reference signal and input signal are generated from the inputted clock signal, changing a phase difference between both signals according to a control signal. However, the input signal generating circuit is shared with a monitor circuit having various delay values compatible with functions of the semiconductor circuit, and does not function for changing the clock period setting margin according to the above-described system clock frequency. Further, the input signal generating circuit is configured with a PLL (Phase-Locked Loop) and selector, and therefore the problem arises that circuit scale increases substantially.

The apparatus of Patent Document 4 sets the level control signal so that the initial value becomes a start-up minimum power supply voltage, and, upon start-up of the semiconductor circuit, time for the power supply voltage to converge to an optimum value can be reduced. However, the setting of the level control signal is only considered upon start-up of the power supply, and therefore the apparatus cannot be compatible with switching of a plurality of system clock frequencies. Namely, the second problem is that, when the system clock frequency is changed from a high frequency to a low frequency, first, the system clock frequency changes, and the power supply voltage is adjusted to be small according to this frequency, but, when the change in frequency is large, the change in power supply voltage also becomes large, and it takes a great deal of time to converge the power supply to the minimum power supply voltage for normal operation. Further, when the system clock frequency is changed from a low frequency to a high frequency, if the system clock frequency increases before the power supply voltage increases, a problem of inviting errors in the internal circuit operation arises.

SUMMARY OF THE INVENTION

It is therefore an object of the present invention to provide a power supply voltage control apparatus capable of arbitrarily setting a clock period setting margin according to a system clock frequency, and converging a power supply voltage to a minimum power supply voltage for normal operation in a short period of time without errors in internal circuit operation in response to switching of a plurality of system clock frequencies.

According to an aspect of the invention, a power supply voltage control apparatus having: a voltage control oscillator section that generates a clock signal; a first frequency-dividing section that frequency-divides the system clock signal; a second frequency-dividing section that frequency-divides an output of the voltage control oscillator section; a comparator section that performs phase comparison or frequency comparison between an output signal of the first frequency-dividing section and an output signal of the second frequency-dividing section; a power supply voltage generating section that generates power supply voltage supplied to the voltage control oscillator section and one or a plurality of internal circuits based on an output of the comparator section; and a control section that sets frequency-dividing ratios of the first and second frequency-dividing sections so that a clock period setting margin of the system clock signal and the clock signal generated by the voltage control oscillator section changes according to system clock frequencies.

According to an aspect of the invention, a power supply voltage control apparatus having: a voltage control oscillator section that generates a clock signal; a comparator section that performs phase comparison or frequency comparison between a reference clock signal and a clock output signal of the voltage control oscillator section; a power supply voltage generating section that generates power supply voltage supplied to the voltage control oscillator section and one or a plurality of internal circuits based on an output of the comparator section; a second preset value storage section that stores a second preset value set a predetermined level higher than minimum operation power supply voltage according to a plurality of system clock frequencies; a control section that, upon switching of the system clock frequencies, reads out the second preset value stored in the second preset value storage section, and outputs the second preset value as a power supply voltage preset value; and a DA converter section that generates power supply voltage supplied to the voltage control oscillator section and one or a plurality of internal circuits based on an output of the control section.

According to an aspect of the invention, a power supply voltage control apparatus having: a power supply voltage generating section that generates power supply voltage supplied to an internal circuit; a preset value storage section that stores minimum predetermined operation power supply voltage corresponding to a plurality of system clock frequencies as a preset power supply voltage setting value; and a control section that, after the system clock frequency is switched from a high frequency to a low frequency, reads out the preset power supply voltage setting value corresponding to the low frequency stored in the preset value storage section and outputs the preset power supply voltage setting value as an operation power supply voltage value, and, before the system clock frequency is switched from a low frequency to a high frequency, reads out the preset power supply voltage setting value corresponding to the high frequency stored in the preset value storage section and outputs the preset power supply voltage setting value as an operation power supply voltage value.

According to another aspect of the invention, a semiconductor integrated circuit apparatus provided with the power supply voltage control apparatus according to claim 1.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DESCRIPTION OF THE PREFERRED EMBODIMENTS

Embodiments of the present invention will be explained below in detail with reference to the accompanying drawings.

Embodiment 1

Figure 1:
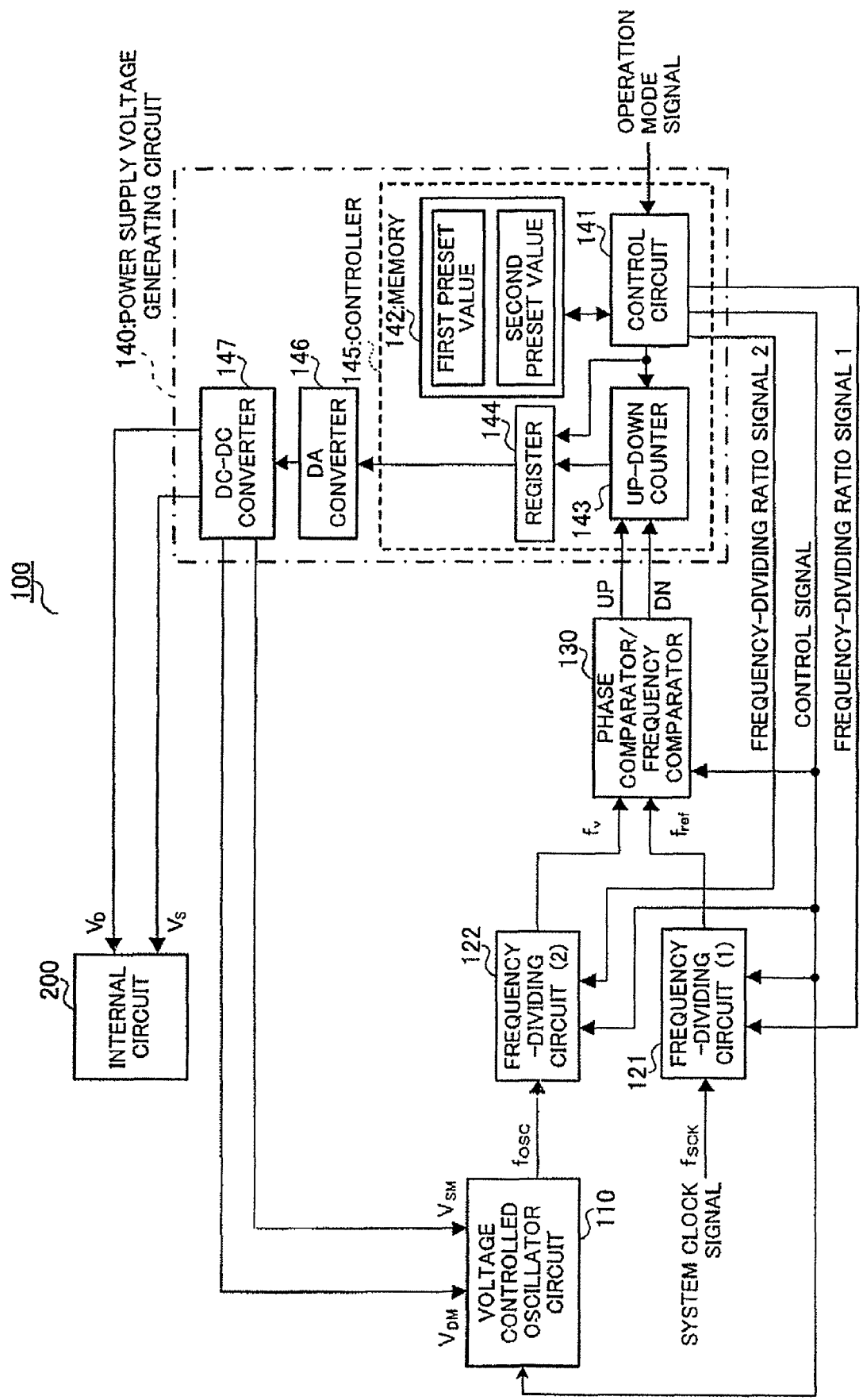
FIG. 1 is a circuit diagram showing a configuration of a power supply voltage control apparatus according to Embodiment 1 of the present invention.

FIG. 1 is a circuit diagram showing a configuration of the power supply voltage control apparatus according to Embodiment 1 of the present invention. This embodiment is an example applied to the power supply voltage control apparatus supplying a predetermined power supply voltage to an internal circuit having a plurality of MOS transistors.

In FIG. 1, reference numeral 100 is a power supply voltage control apparatus, and reference numeral 200 is an internal circuit that operates by receiving the supply of power supply voltages $V_D$ and $V_S$ from power supply voltage control apparatus 100.

Power supply voltage control apparatus 100 adopts a configuration having: voltage control oscillator circuit 110 that generates a clock signal; frequency-dividing circuit 121 (frequency-dividing circuit <1>) that frequency-divides system clock signal $f_{SCK}$; frequency-dividing circuit 122 (frequency-dividing circuit <2>) that frequency-divides clock output signal $f_{OSC}$ of voltage control oscillator circuit 110; phase comparator/frequency comparator 130 that performs phase comparison or frequency comparison between the output (reference clock signal $f_{ref}$) of frequency-dividing circuit 121 and the output (oscillation clock signal $f_V$) of frequency-dividing circuit 122; and power supply voltage generating circuit 140 that generates power supply voltage supplied to the internal circuit.

Power supply voltage generating circuit 140 adopts a configuration having: controller 145 that has control circuit 141, memory 142 that stores a plurality of first preset values and a plurality of second preset values, up/down counter 143 and register 144; DA converter 146 that DA converts a digital value outputted from controller 145 and generates power supply voltage; and DC-DC converter 147.

Frequency-dividing ratios of frequency-dividing circuit 121 and frequency-dividing circuit 122 to the plurality of system clock frequencies are stored in memory 142 as respective first preset values, and power supply voltage preset values for the plurality of system clock frequencies are respectively stored as second preset values.

Control circuit 141 of controller 145 receives an operation mode signal from outside, outputs frequency-dividing ratio signal 1 and a control signal to frequency-dividing circuit 121 and frequency-dividing ratio signal 2 and a control signal to frequency-dividing circuit 122 based on a first preset value within memory 142, outputs control signals to voltage control oscillator circuit 110 and phase comparator/frequency comparator 130, and compares the phase or frequency of each clock signal by controlling each section. Further, control circuit 141 initializes power supply voltages $V_D$ and $V_S$ supplied to internal circuit 200 and power supply voltages $V_{DM}$ and $V_{SH}$ supplied to voltage control oscillator circuit 110 by setting a count value of up-down counter 143 and register 144 using the second preset value within memory 142. In this embodiment, two series of power supply voltages ($V_D$, $V_S$, and $V_{DM}$, $V_{SM}$) are supplied from power supply voltage generating circuit 140, but it is also possible to supply only one of $V_D$ and $V_{DM}$ or $V_S$ and $V_{SM}$, and set the other as fixed power supply.

Internal circuit 200 may be any circuit where power supply voltage of the internal MOS transistor etc. can be controlled by power supply voltage control apparatus 100.

In this way, power supply voltage control apparatus 100 is configured with: frequency-dividing circuit 121 that frequency-divides the system clock at frequency-dividing ratio 1; frequency-dividing circuit 122 that frequency-divides the output of voltage control oscillator circuit 110 at frequency-dividing ratio 2; phase comparator/frequency comparator 130 that performs phase comparison or frequency comparison on the respective output signals of frequency-dividing circuit 121 and frequency-dividing circuit 122; controller 145 that is configured with up-down counter 143, register 144, memory 142 and control circuit 141; DA converter 146; DC-DC converter 147; and internal circuit 200. Further, power supply voltage generating circuit 140 is configured with controller 145, DA converter 146 and DC-DC converter 147.

Figure 2:
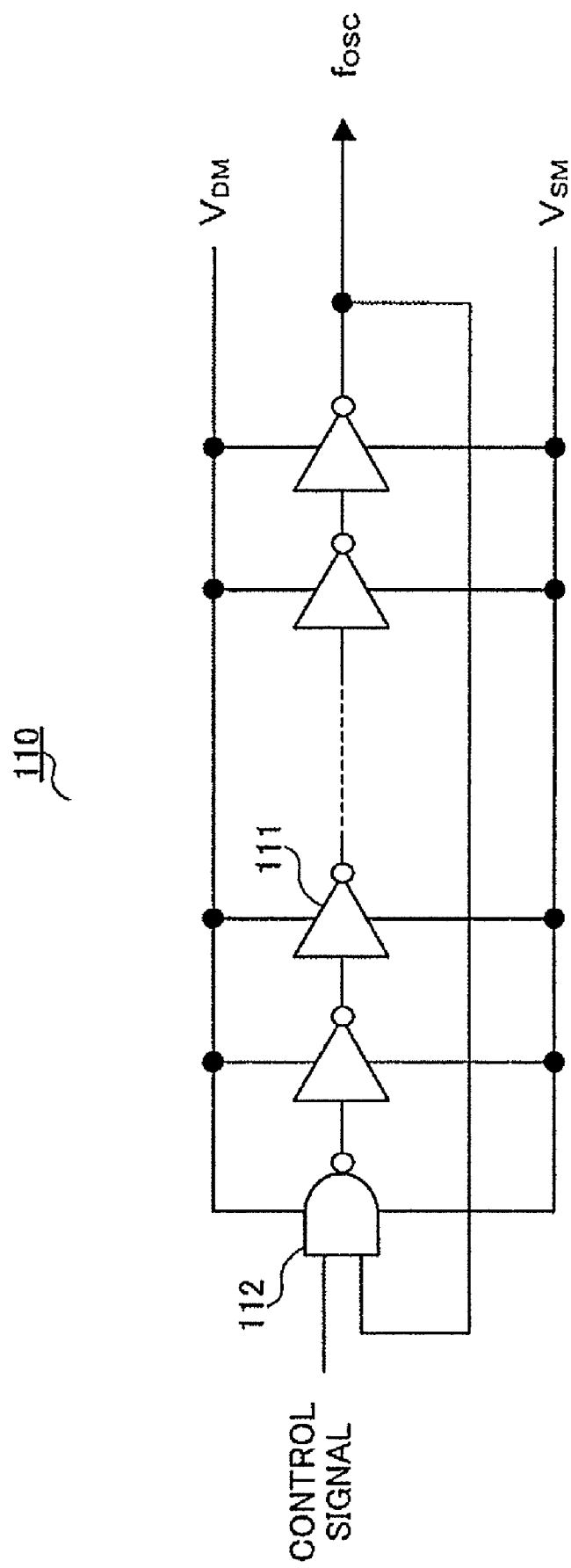
FIG. 2 is a circuit diagram showing a configuration of a voltage control oscillator circuit of the power supply voltage control apparatus according to the above-described embodiment.

FIG. 2 shows an example of a circuit configuration of voltage control oscillator circuit 110.

In FIG. 2, voltage control oscillator circuit 110 configures a ring oscillator by connecting single NAND gate circuit 112 with a control signal inputted to one input terminal, and an even number of inverters 111 in a chain shape. In place of the ring oscillator using inverters, it is also possible to use a critical path replica replicating the critical path of the internal circuit. The critical path replica self-oscillates by applying high potential side power supply voltage $V_{DM}$ and low potential side power supply voltage $V_{SM}$ from power supply voltage generating circuit 140. The oscillating frequency of clock output signal $f_{OSC}$ of voltage control oscillator circuit 110 changes by changing the voltage difference between $V_{DM}$ and $V_{SM}$. Further, when the control signal is L (low level), voltage control oscillator circuit 110 stops the oscillation.

Figure 3:
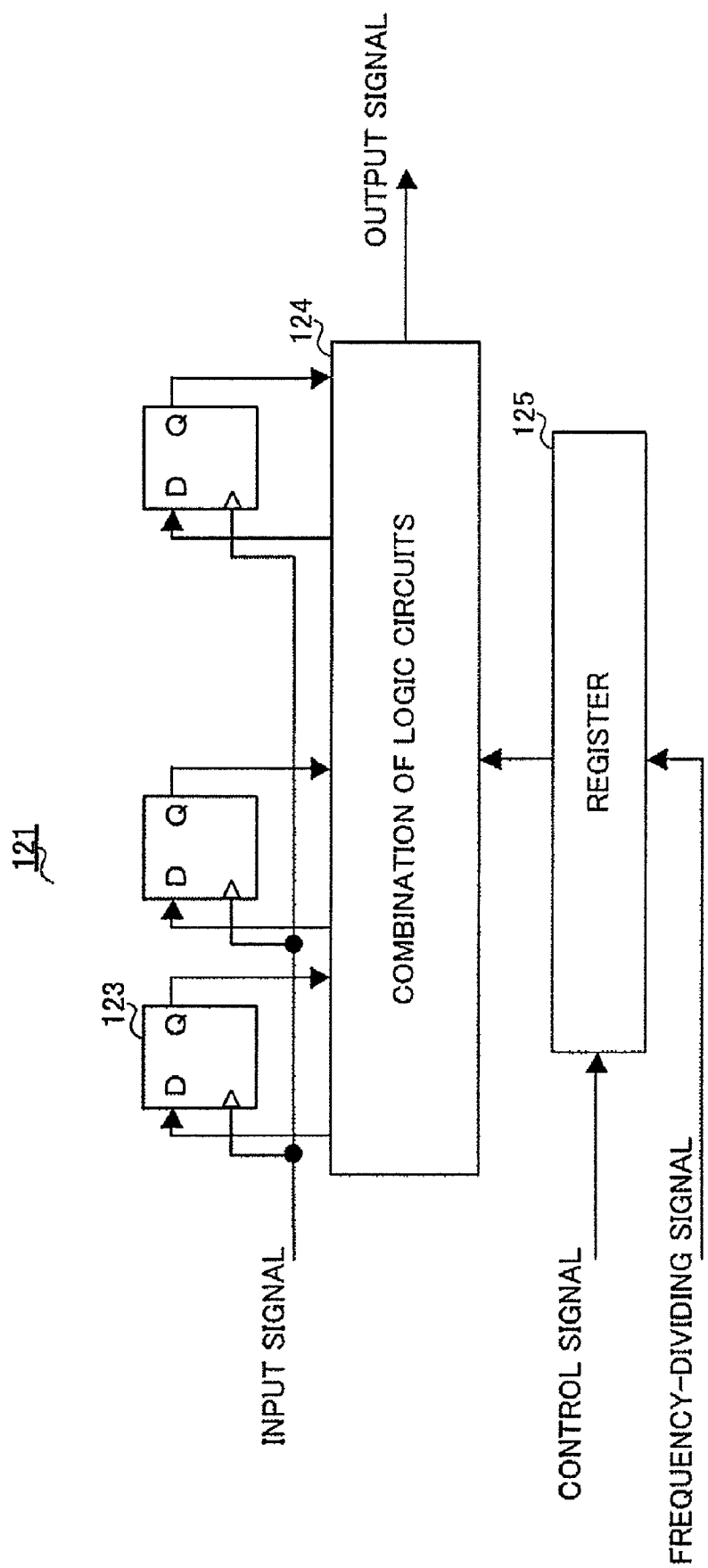
FIG. 3 is a circuit diagram showing a configuration of a frequency-dividing circuit of the power supply voltage control apparatus according to the above-described embodiment.

FIG. 3 shows an example of the circuit configurations of frequency-dividing circuit 121 and frequency-dividing circuit 122.

Frequency-dividing circuit 121 and frequency-dividing circuit 122 adopt the same configuration, and therefore frequency-dividing circuit 121 will be described as a representative. In FIG. 3, frequency-dividing circuit 121 is configured with a plurality of flip-flops (FF) 123, combination logic circuit 124 and register 125. A frequency-dividing ratio signal corresponding to the operation mode signal and the control signal are received from control circuit 141 within controller 145, and, for example, the frequency-dividing ratio signal is loaded to register 125 at the timing of a rising edge of the control signal, its register value is provided to combination logic circuit 124, and the frequency-dividing ratio of frequency-dividing circuit 121 is decided.

Figure 4:
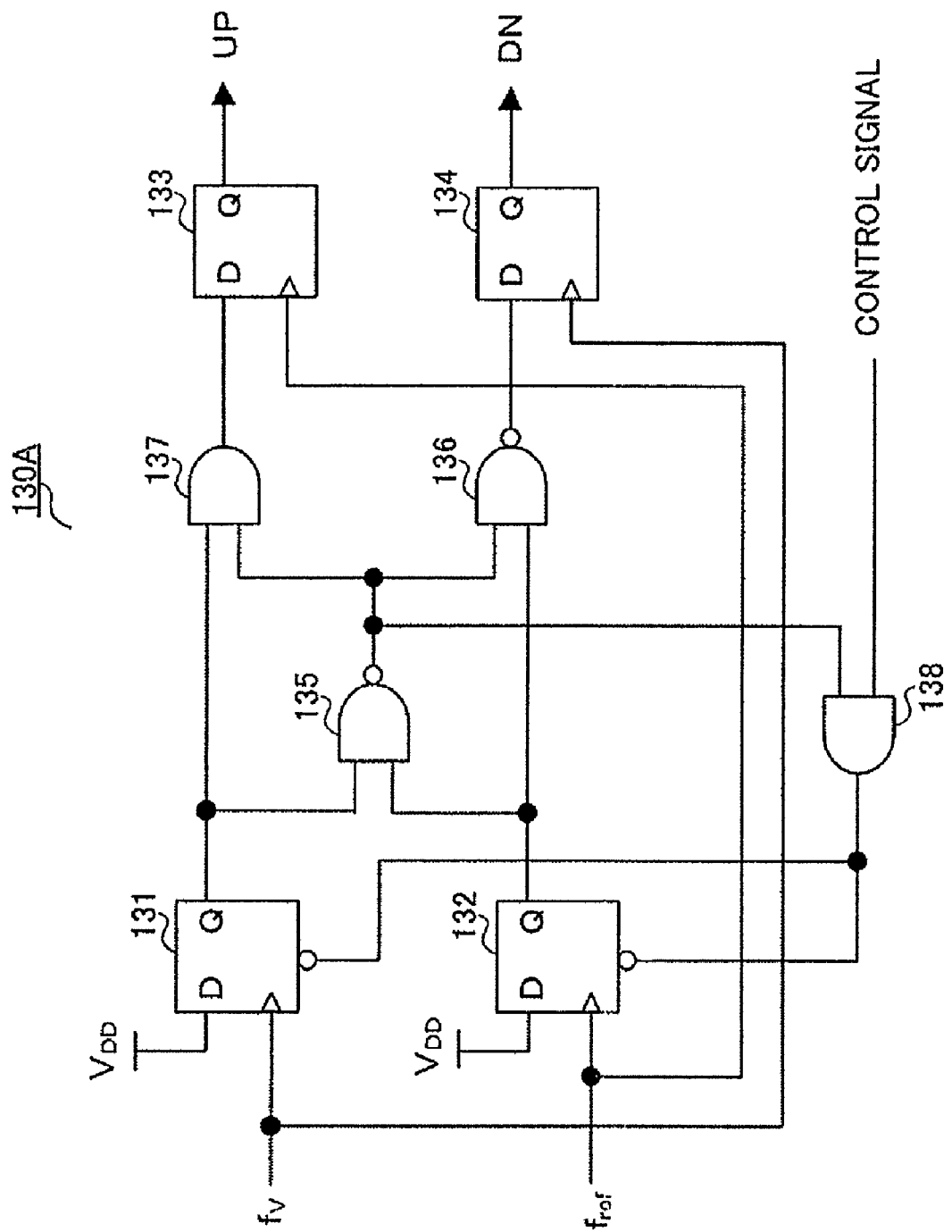
FIG. 4 is a circuit diagram showing a configuration of a phase comparator of the power supply voltage control apparatus according to the above-described embodiment.

FIG. 4 shows an example of the circuit configuration of phase comparator 130A out of the above-described phase comparator/frequency comparator 130.

In FIG. 4, phase comparator 130A is configured with logic circuits of flip-flops (FF) 131 to 134, NAND circuits 135 and 136, and AND circuits 137 and 138. In these logic circuits, when the phase of oscillating clock signal $f_V$ leads the phase of reference clock signal $f_{ref}$, down signal DN is H (high level), and, when the phase of the oscillating clock signal $f_V$ lags the phase of reference clock signal $f_{ref}$, up signal UP is H (high level). Further, when the control signal is L (low level), phase comparator 130A stops circuit operation.

Figure 5:
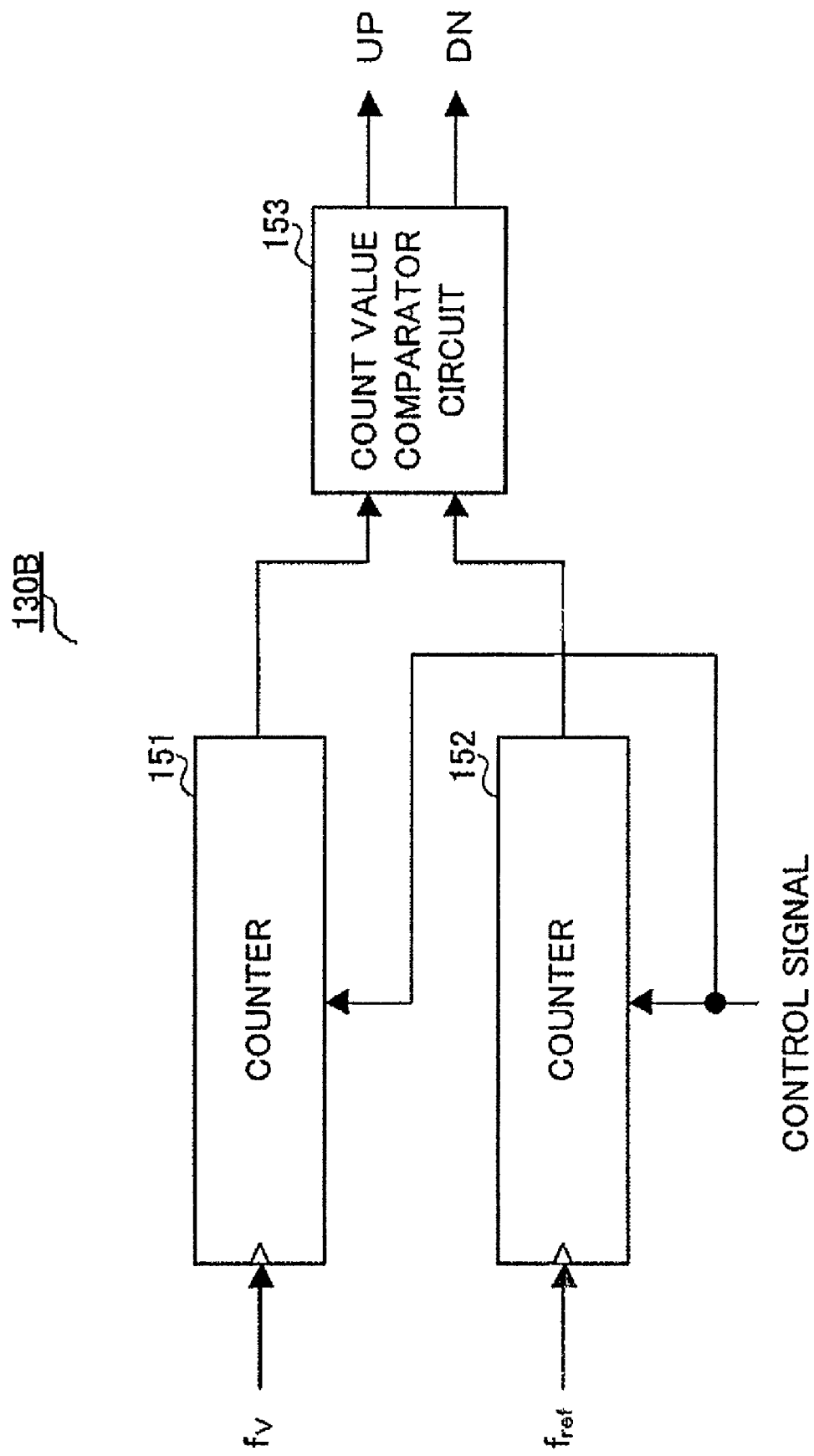
FIG. 5 is a circuit diagram showing a configuration of a frequency comparator of the power supply voltage control apparatus according to the above-described embodiment.

FIG. 5 shows an example of a circuit configuration of frequency comparator 130B out of phase comparator/frequency comparator 130.

In FIG. 5, frequency comparator 130B is configured with counter 151 that counts oscillating clock signal $f_V$, counter 152 that counts reference clock signal $f_{ref}$, and count value comparator circuit 153 that compares the count value of counter 151 and the count value of counter 152.

Oscillating clock signal $f_V$ and reference clock signal $f_{ref}$ respectively perform count up for a fixed period, and compare respective count values. When the frequency of oscillating clock signal $f_V$ is higher than the frequency of reference clock signal $f_{ref}$, down signal DN becomes H (high level), and, when the frequency of oscillating clock signal $f_V$ becomes lower than the frequency of reference clock signal $f_{ref}$, up signal UP becomes H (high level). Further, when the control signal is L (low level), frequency comparator 130B stops circuit operation.

Figure 6:
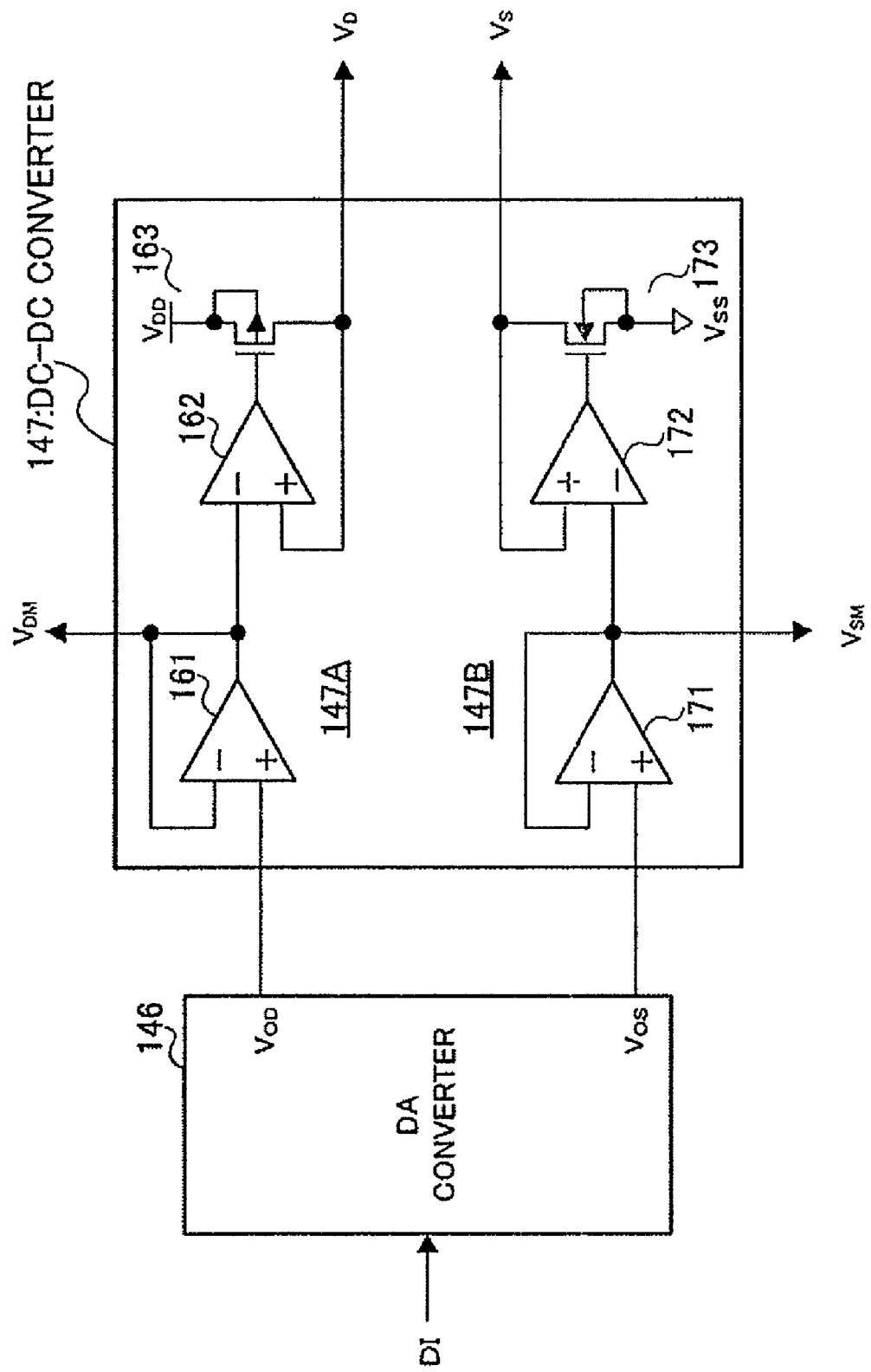
FIG. 6 is a circuit diagram showing a configuration example of a DC-DC converter of the power supply voltage control apparatus according to the above-described embodiment.

FIG. 6 shows an example of the circuit configuration of the above-described DC-DC converter 147.

In FIG. 6, DC-DC converter 147 incorporates components for two output circuits, and high potential side power supply voltage output circuit 147A is configured with two operational amplifiers 161 and 162, and single PchMOS transistor 163. Further, low potential side power supply voltage output circuit 147B is configured with two operational amplifiers 171 and 172, and single NchMOS transistor 173, and has the same circuit configuration as high potential side power supply voltage output circuit 147A with the exception that low potential side power supply voltage $V_{SS}$ is supplied to the source terminal of NchMOS transistor 173.

When a circuit of high potential side power supply voltage output circuit 147A is described as a representative, the output of first operational amplifier 161 is applied to voltage control oscillator circuit 110, and the drain output of PchMOS transistor 163 is applied to internal circuit 200. The + input terminal of first operational amplifier 161 is connected to the output of DA converter 146, the output terminal of first operational amplifier 161 is connected to the − input terminal of first operational amplifier 161 and the − input terminal of second operational amplifier 162, the output terminal of second operational amplifier 162 is connected to the gate terminal of PchMOS transistor 163, high-potential side power supply voltage $V_{DD}$ is supplied to the source terminal of PchMOS transistor 163, and the drain terminal is connected to the + input terminal of second operational amplifier 162. As a result of this circuit configuration, it is possible to ensure that the power supply voltage of the voltage control oscillator circuit is not subjected to the influence of fluctuations of the power supply voltage of the internal circuit.

The power supply voltage control operation of power supply voltage control apparatus 100 as configured above will be described below. This embodiment adopts the following methods 1 and 2 in order to resolve the above-described first and second problems.

[Method 1]

By inserting frequency dividing circuits 121 and 122 between system clock signal $f_{SCK}$ and voltage control oscillator circuit 110, and phase comparator/frequency comparator 130, and setting the frequency-dividing ratios of frequency-dividing circuits 121 and 122 respectively using control circuit 141 based on the first preset value according to the operation mode signal corresponding to the system clock frequency, it is possible to set an optimum clock period setting margin according to the system clock frequency.

Specifically, reference clock signal $f_{ref}$ is generated by frequency-dividing system clock signal $f_{SCK}$ using frequency-dividing circuit 121, and oscillating clock signal $f_V$ is generated by frequency-dividing clock output signal $f_{OSC}$ of voltage control oscillator circuit 110 using frequency-dividing circuit 122. Phase comparison or frequency comparison is then performed on the respective clock signals. Here, frequency-dividing ratio signal 1 of frequency-dividing circuit 121 and frequency-dividing ratio signal 2 of frequency-dividing circuit 122 are outputted from control circuit 141 based on the first preset value according to the operation mode signal corresponding to the system clock frequency. The result of the phase comparison or the frequency comparison is then inputted to up-down counter 143 within controller 145 of power supply voltage generating circuit 140. Up-down counter 143 and register 144 are initialized by control circuit 141 using the second preset value within controller 145 and the register value of register 144 is inputted to DA converter 146. The output of DA converter 146 is respectively applied as power supply voltage to voltage control oscillator circuit 110 and internal circuit 200 via DC-DC converter 147.

When the frequency of oscillating clock signal $f_V$ is lower than the frequency of reference clock signal $f_{ref}$, up-down counter 143 performs count up, and when the frequency of oscillating clock signal $f_V$ is higher than the frequency of the reference clock signal $f_{ref}$, up-down counter 143 performs count down. The count value is stored in register 144, and the power supply voltage applied to voltage control oscillator circuit 110 and internal circuit 200 is changed.

The clock period setting margin of clock output signal $f_{OSC}$ and system clock signal $f_{SCK}$ is decided by frequency-dividing ratio 1 and frequency-dividing ratio 2, and can be set freely according to the operation mode signal corresponding to the system clock frequency. This resolves the first problem.

[Method 2]

When the system clock frequency changes, by initializing up-down counter 143 and setting register 144 using the second preset value in controller 145 and optimizing the procedure for changing the system clock frequency and the power supply voltage, it is possible to prevent errors in operation of the internal circuit and reduce the time to converge to the minimum power supply voltage where operation is possible.

As a result, it is possible to implement both low power consumption and continuous stable operation at the same time.

Specifically, after the system clock frequency is switched from a high frequency to a low frequency, or before switching from a low frequency to a high frequency, the operation mode signal corresponding to this is inputted to the control circuit. Control circuit 141 then reads out the second preset value corresponding to the operation mode signal as a power supply voltage preset value, initializes up-down counter 143, and changes the register value of register 144. The power supply voltage corresponding to the register value is applied to internal circuit 200 and voltage control oscillator circuit 110, and the values of frequency-dividing ratio signal 1 and frequency-dividing ratio signal 2 are changed at the same time based on the first preset value. When the system clock frequency is switched from a low frequency to a high frequency, the system clock frequency at this time is set to a high frequency, and power supply voltage control operation starts. This resolves the second problem.

As a result of the two methods described above, when the system clock frequency is switched, it is possible to freely set the clock period setting margin of system clock signal $f_{SCK}$ inputted to frequency-dividing circuit 121 and clock output signal $f_{OSC}$ inputted to frequency-dividing circuit 122 according to the system clock frequency, and converge power supply voltage to minimum power supply voltage where normal operation is possible in a short period of time without causing errors in operation of internal circuit 200. The above-described power supply voltage control operation of power supply voltage control apparatus 100 will be described in detail.

First, control circuit 141 of power supply voltage generating circuit 140 receives an operation mode signal corresponding to the system clock frequency, reads out the second preset value within memory 142 as a power supply voltage preset value, and initializes up-down counter 143 and register 144. Based on the second preset value, the output DA converted at DA converter 146 applies power supply voltages $V_{DN}$ and $V_{SM}$ to voltage control oscillator circuit 110 via DC-DC converter 147 and power supply voltages $V_D$ and $V_S$ to internal circuit 200. Power supply voltages $V_{DM}$ and $V_D$ and power supply voltage $V_{SM}$ and $V_S$ are the same voltage.

Next, frequency-dividing ratios are set at frequency-dividing circuit 121 and frequency-dividing circuit 122 by control circuit 141 based on the first preset value within memory 142.

Oscillating clock signal $f_V$ is generated by frequency-dividing clock output signal $f_{OSC}$ of voltage control oscillator circuit 110 using frequency-dividing circuit 122, and reference clock signal $f_{ref}$ is generated by frequency-dividing system clock signal $F_{SCK}$ using frequency-dividing circuit 121.

Next, phase comparison or frequency comparison is then performed on the respective clock signals. The result of the phase comparison or the frequency comparison is then inputted to up-down counter 143 of power supply voltage generating circuit 140. When the frequency of oscillating clock signal $f_V$ is lower than the frequency of reference clock signal $f_{ref}$ up signal UP is outputted from phase comparator/frequency comparator 130 and up-down counter 143 performs count up. Conversely, when the frequency of oscillating clock signal $f_V$ is higher than the frequency of reference clock signal $f_{ref}$ down signal DN is outputted from phase comparator/frequency comparator 130 and up-down counter 143 performs count down. The count value is stored in register 144, its register value is inputted to DA converter 146, and the power supply voltage of the voltage control oscillator circuit is made to change via DA converter 146 and DC-DC converter 147.

Namely, when the frequency of oscillating clock signal $f_V$ outputted from voltage control oscillator circuit 110 and passing through frequency-dividing circuit 122 is lower than the frequency of reference clock signal $f_{ref}$, the difference in voltage between $V_{DM}$ and $V_{SM}$ outputted from power supply voltage generating circuit 140 becomes larger, and the oscillation frequency of voltage control oscillator circuit 110 becomes higher. Conversely, when the frequency of the oscillating clock signal $f_V$ outputted from voltage control oscillator circuit 110 and passing through frequency-dividing circuit 122 is higher than the frequency of reference clock signal $f_{ref}$, the difference in voltage between $V_{DM}$ and $V_{SM}$ outputted from power supply voltage generating circuit 140 becomes smaller, and the oscillation frequency of voltage control oscillator circuit 110 becomes lower. Finally, power supply voltages $V_{DM}$, $V_{SM}$, $V_D$ and $V_S$ are set so that the frequency of oscillating clock signal $f_V$ and the frequency of reference clock signal $f_{ref}$ become the same.

Further, with the circuit configuration of this embodiment, the clock period setting margin of clock output signal $f_{OSC}$ and system clock signal $f_{SCK}$ is decided by the values of frequency-dividing ratio signal 1 and frequency-dividing ratio signal 2, and can be set arbitrarily according to the operation mode signal corresponding to the system clock frequency.

Next, a method for setting power supply voltage preset values for the system clock frequency when the system clock frequency is switched will be described.

Figure 7:
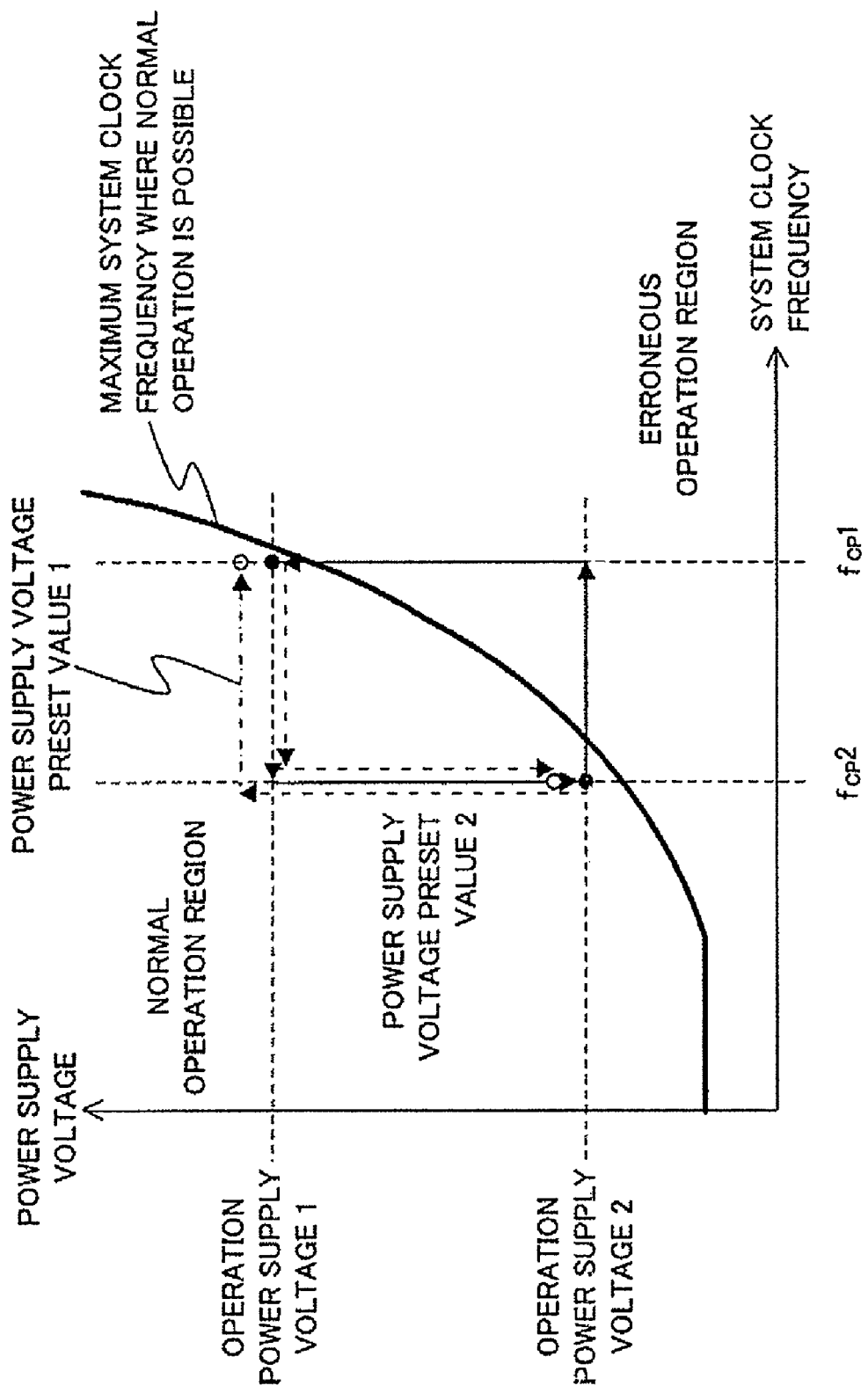
FIG. 7 shows the relationship between system clock frequency and power supply voltage and preset values of the power supply voltage control apparatus according to the above-described embodiment.

FIG. 7 shows the relationship of the system clock frequency, power supply voltage and power supply voltage preset value.

From FIG. 7, when the second problem is confirmed, in the case where the system clock frequency changes from a high frequency to a low frequency (refer to the bulleted dotted line arrow for $f_{CP1}$ to $f_{CP2}$ in FIG. 7), first, the system clock frequency changes, and the power supply voltage is adjusted to be small according to this frequency, but in the case where the change in frequency is large, the change in power supply voltage also becomes large, and it takes a great deal of time to converge the power supply to the minimum power supply voltage for normal operation. Further, in the case of changing the system clock frequency from a low frequency to a high frequency (refer to the bulleted dotted line arrow for $f_{CP2}$ to $f_{CP1}$ in FIG. 7) when the system clock frequency becomes high before the power supply voltage becomes large, a problem arises that the internal circuit enters an error operation region in FIG. 7 and errors in operation of the internal circuit are invited. In this embodiment, when the system clock, frequency is lowered, after the system clock frequency is lowered, the second preset value within memory 142 is read out as power supply voltage preset value 2 and set in register 144. When the system clock frequency is raised, before raising the system clock frequency, a second preset value within memory 142 is read out as power supply voltage preset value 1 and set in register 144. In this way, the power supply voltage is set to a power supply voltage preset value slightly higher than operation power supply voltages 1 and 2 that are the targets as shown in the white circle chain line arrows of FIG. 7. In this way; when the system clock frequency is raised, first, after the power supply voltage is set slightly higher than the target operation power supply voltage, by changing the system clock frequency, errors in operation are prevented. Further, by replacing the power supply voltage convergence value with the second preset value corresponding to the system clock frequency within memory 142, it is possible to use the power supply voltage convergence value for the previous time from the next time.

In FIG. 1, first, when the time of switching the system clock frequency from high frequency $f_{CP1}$ to low frequency $f_{CP2}$ is considered, the system clock frequency is first switched from high frequency $f_{CP1}$ to low frequency $f_{CP2}$ with operation power supply voltage 1 shown in FIG. 7 as is, the operation mode signal corresponding to low frequency $f_{CP2}$ is inputted to control circuit 141, and control circuit 141 reads out the second preset value within memory 142 as power supply voltage preset value 2 corresponding to the operation mode signal and sets power supply voltage preset value 2 to up-down counter 143 and register 144. The power supply voltage corresponding to power supply voltage preset value 2 is applied to internal circuit 200 and voltage control oscillator circuit 110. At the same time, the value of frequency-dividing ratio signal 1 of frequency-dividing circuit 121 and frequency-dividing ratio signal 2 of frequency-dividing circuit 122 are changed based on the first preset value within memory 142. After this, the power supply voltage control operation starts, and the power supply voltage converges to operation power supply voltage 2.

Next, when the time where the system clock frequency is switched from low frequency $f_{CP2}$ to high frequency $f_{CP1}$ is considered, before switching from low frequency $f_{CP2}$ to high frequency $f_{CP1}$, the operation mode signal corresponding to high frequency $f_{CP1}$ is inputted to control circuit 141, and control circuit 141 reads out the second preset value within memory 142 as power supply voltage preset value 1 corresponding to the operation mode signal and sets power supply voltage preset value 1 to up-down counter 143 and register 144. The power supply voltage corresponding to power supply voltage preset value 1 is then applied to internal circuit 200 and voltage control oscillator circuit 110. At the same time, the values of frequency-dividing ratio signal 1 of frequency-dividing circuit 121 and frequency-dividing ratio signal 2 of frequency-dividing circuit 122 are changed based on the first preset value within memory 142. After this, the system clock frequency is set to a high frequency, power supply voltage control operation starts, and the power supply voltage converges to operation power supply voltage 1.

If the power supply voltage is stable and $f_V$ and $f_{ref}$ are the same frequency for a fixed period, the value of register 144 storing the count value is replaced with the original second preset value with in memory 142. Then, if the stored preset value is used in the next time when the power supply voltage control operation is carried out at the same frequency as the system clock frequency, it is possible to reduce the time for converging to the minimum power supply voltage where normal operation is possible.

Further, after converging to the minimum power supply voltage where normal operation is possible, by applying power supply voltage using the value of register 144 storing the count value upon convergence and stopping unnecessary circuits of power supply voltage control circuit 100, it is possible to achieve lower power consumption. For example, in Embodiment 1, by setting the control signal to L (low level) it is possible to stop circuit operation of voltage control oscillator circuit 110 and phase comparator/frequency comparator 130.

As described in detail above, according to this embodiment, power supply voltage control apparatus 100 is provided with frequency-dividing circuit 121 that frequency-divides the system clock at frequency-dividing ratio 1, frequency-dividing circuit 122 that frequency-divides the output of voltage control oscillator circuit 110 at frequency-dividing ratio 2, phase comparator/frequency comparator 130 that performs phase comparison/frequency comparison of the respective output signals of frequency-dividing circuit 121 and frequency-dividing circuit 122, and memory 142 within controller 145, and by setting frequency-dividing ratios for frequency-dividing circuits 121 and 122 based on the first preset value within memory 142 using control circuit 141 according to the operation mode signal corresponding to the system clock frequency, it is possible to set an optimum clock period setting margin.

Further, when the system clock frequency changes, by initializing and carrying out register setting up-down counter 143 using the second preset value within memory 142 in controller 145 and optimizing the procedure for changing the system clock frequency and the power supply voltage, it is possible to prevent errors in operation of the internal circuit and reduce the time for converging to the minimum power supply voltage where operation is possible. As a result, it is possible to implement both low power consumption and continuous stable operation at the same time.

Embodiment 2

Figure 8:
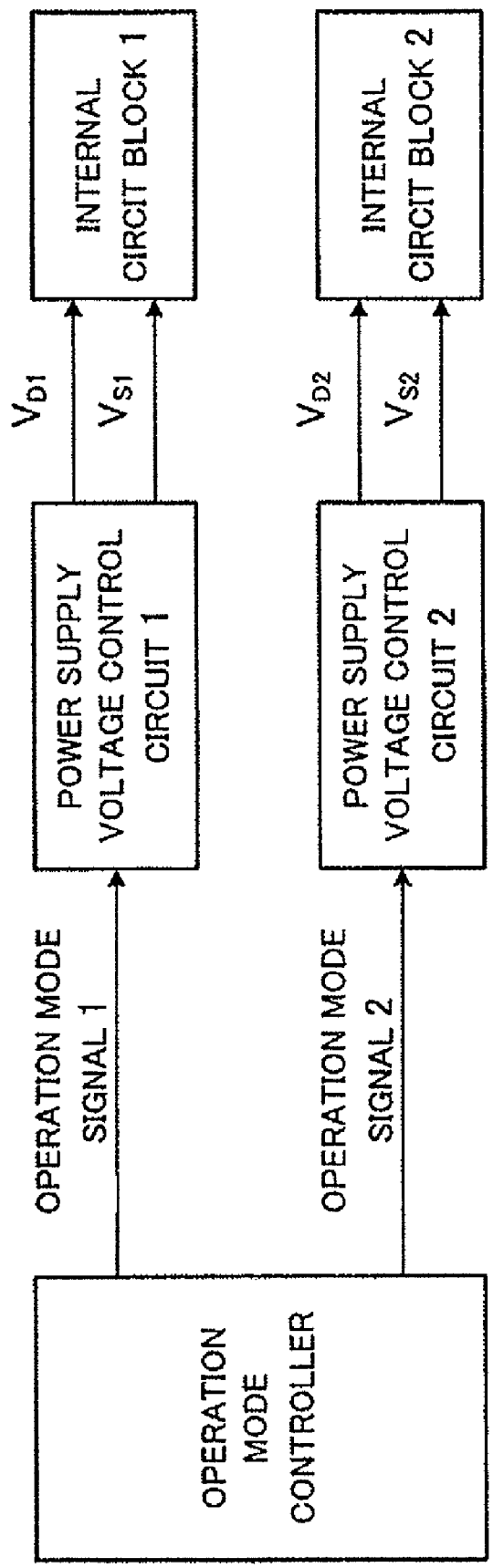
FIG. 8 is a circuit diagram showing a configuration of the power supply voltage control apparatus according to Embodiment 2 of the present invention.

FIG. 8 is a circuit diagram showing a configuration of the power supply voltage control apparatus according to Embodiment 2 of the present invention. This embodiment is an example of the case where a plurality of internal circuit blocks exist and power supply voltage control is carried out for each internal circuit block.

FIG. 8 shows the configuration where internal circuit block 1 and internal circuit block 2 are independently controlled by power supply voltage control circuit 1 and power supply voltage control circuit 2, respectively, and operation mode controllers control power supply voltage control circuits 1 and 2 by operation mode signals.

The circuit configuration and circuit operation of each power supply voltage control circuit is exactly the same as described above, and therefore explanation is omitted.

Embodiment 3

Figure 9:
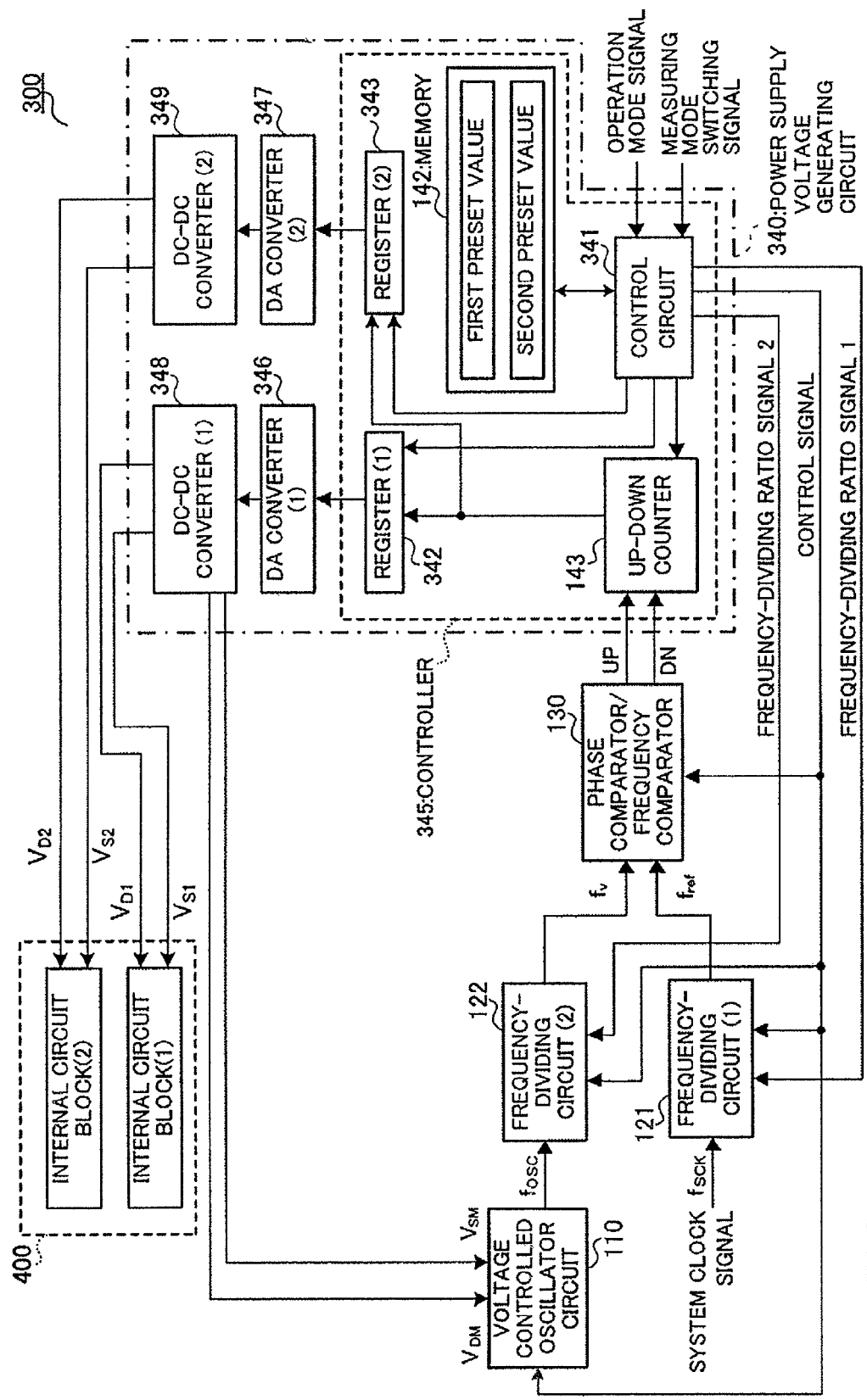
FIG. 9 is a circuit diagram showing a configuration of the power supply voltage control apparatus according to Embodiment 3 of the present invention.
Figure 10:
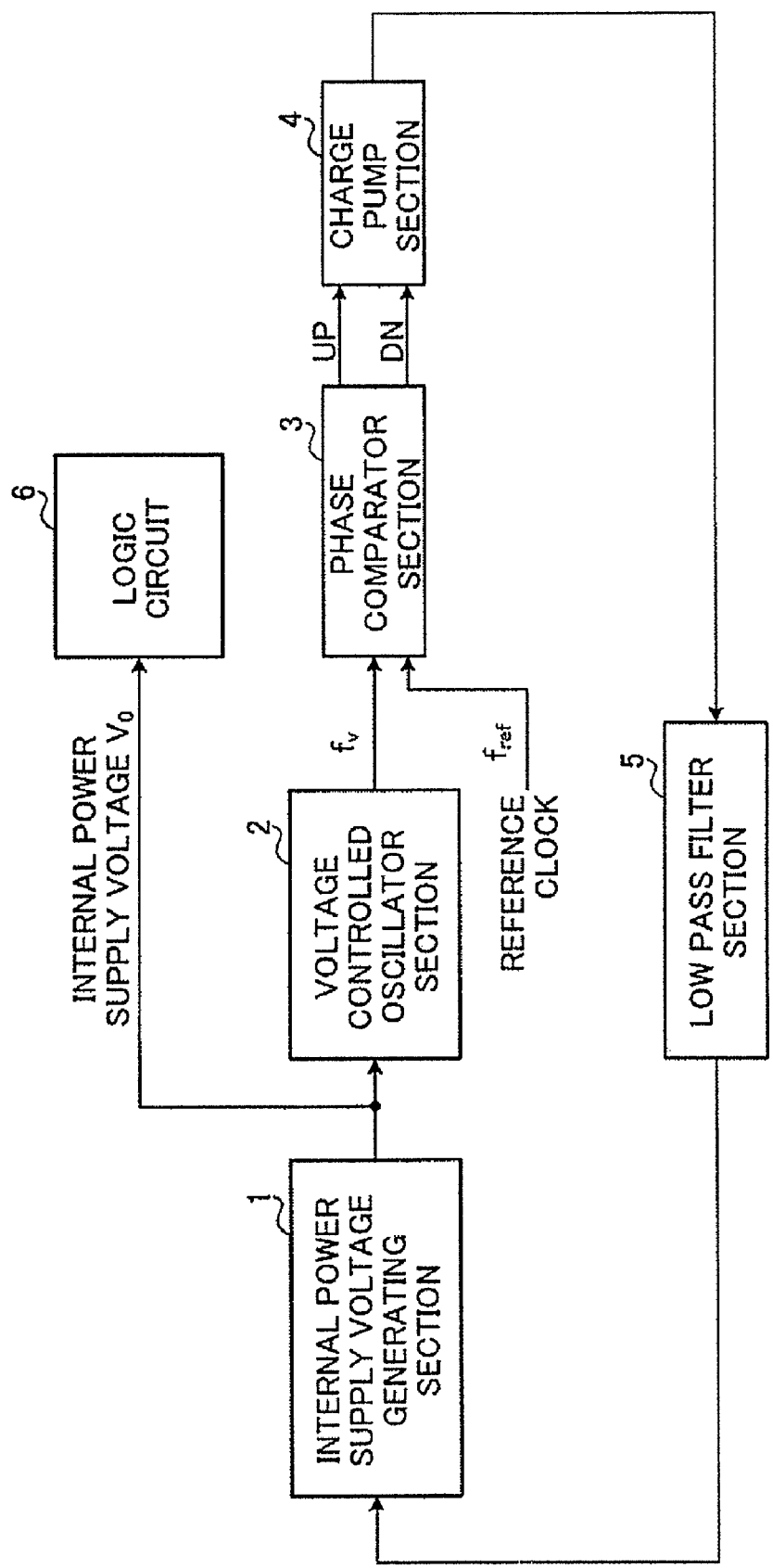
FIG. 10 shows a configuration of the conventional power supply voltage control apparatus.
Figure 11:
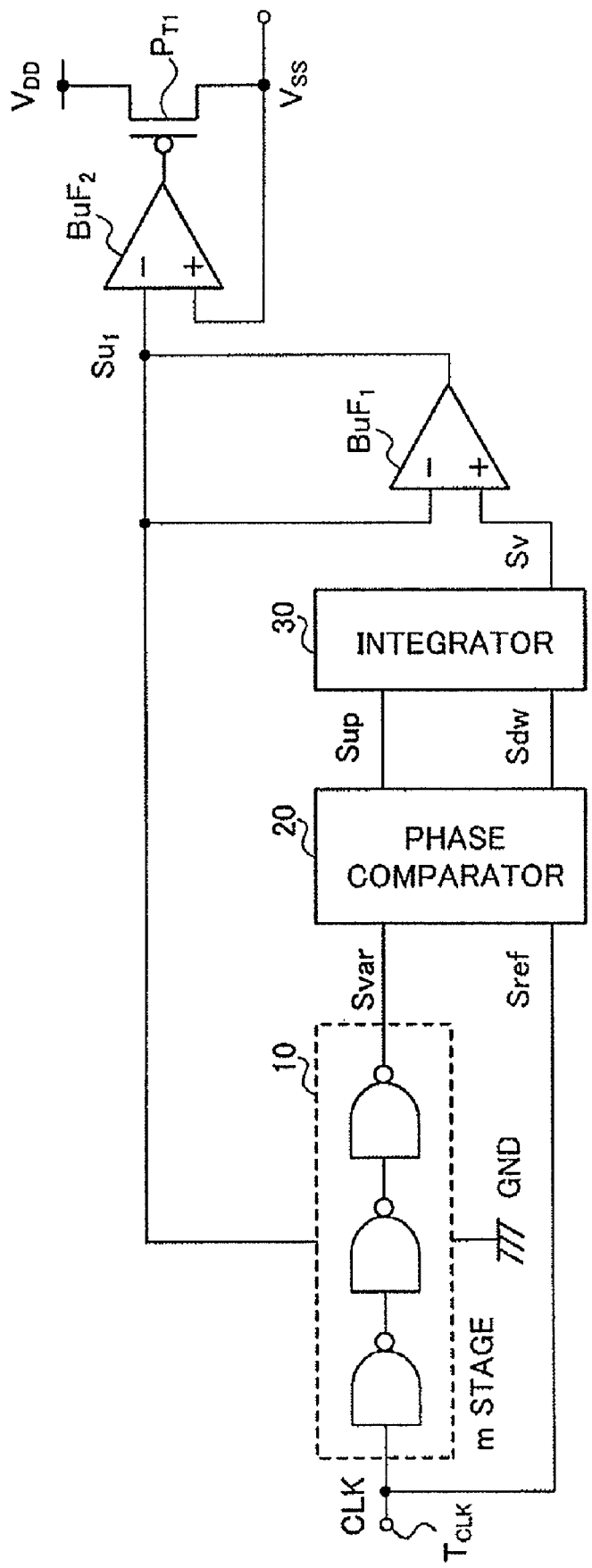
FIG. 11 shows a configuration of the conventional power supply voltage control apparatus.
Figure 12:
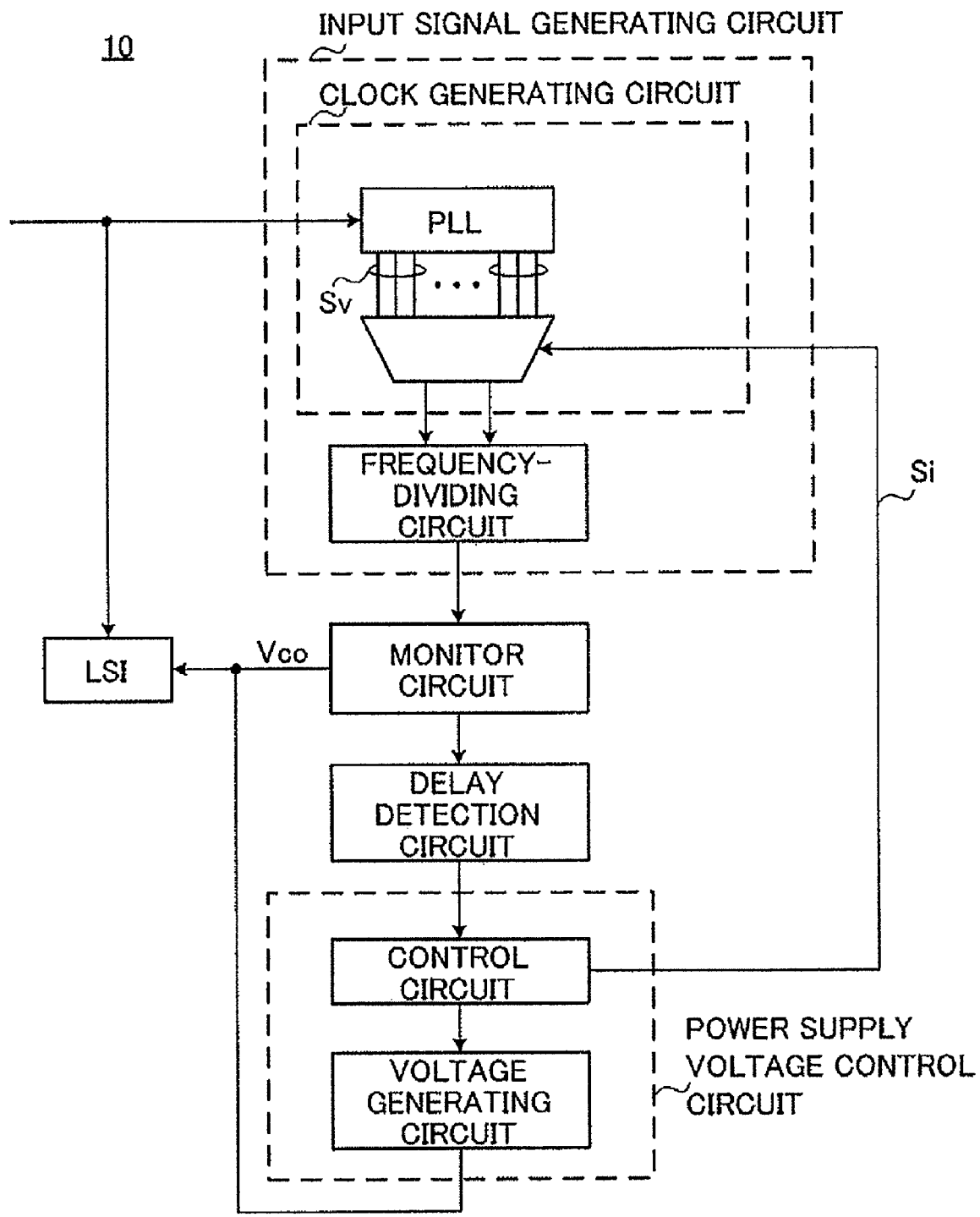
FIG. 12 shows a configuration of the conventional power supply voltage control apparatus.
Figure 13:
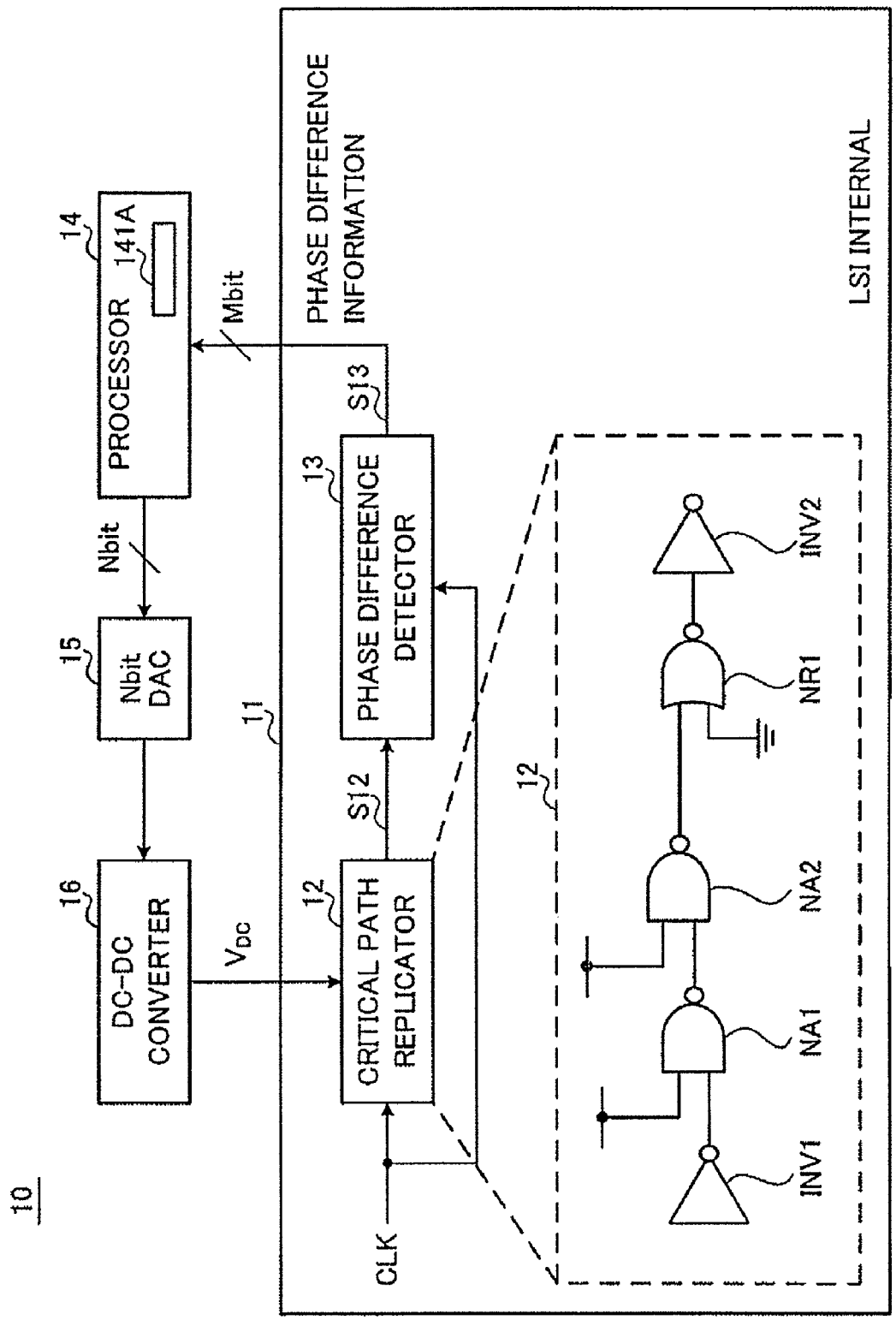
FIG. 13 shows a configuration of the conventional power supply voltage control apparatus.

FIG. 9 is a circuit diagram showing a configuration of the power supply voltage control apparatus according to Embodiment 3 of the present invention. This embodiment is an example of a circuit configuration where a plurality of internal circuit blocks exist, and power supply voltages of a plurality of internal circuit blocks (two in this embodiment) are controlled with a single power supply voltage control circuit. Components that are identical with FIG. 1 will be assigned the same reference numerals without description of the duplicated parts.

In FIG. 9, reference numeral 300 is a power supply voltage control apparatus, and reference numeral 400 is an internal circuit block <1> operating by receiving the supply of power supply voltages $V_{D1}$ and $V_{S1}$ from power supply voltage control apparatus 300, and an internal circuit block <2> operating by receiving the supply of power supply voltages $V_{D2}$ and $V_{S2}$.

Power supply voltage control apparatus 300 adopts a configuration having: voltage control oscillator circuit 110 that generates a clock signal; frequency-dividing circuit 121 (frequency-dividing circuit <1>) that frequency-divides system clock signal $f_{SCK}$; frequency-dividing circuit 122 (frequency-dividing circuit <2>) that frequency-divides clock output signal $f_{OSC}$ of voltage control oscillator circuit 110; phase comparator/frequency comparator 130 that performs phase comparison or frequency comparison between the output (reference clock signal $f_{ref}$) of frequency-dividing circuit 121 and the output (oscillating clock signal $f_V$) of frequency-dividing circuit 122; and power supply voltage generating circuit 340 that generates power supply voltage supplied to the internal circuit blocks <1> and <2>.

Power supply voltage generating circuit 340 supplies power supply voltages $V_{D1}$ and $V_{S1}$ to internal circuit block <1> and at the same time supplies power supply voltages $V_{D2}$ and $V_{S2}$ to internal circuit block <2> and adopts a configuration having: controller 345 that is configured with control circuit 341, memory 142 that stores a plurality of first preset values and a plurality of second preset values, up-down counter 143, register 342 (register <1>) and register 343 (register <2>); DA converter 346 (DA converter <1>) and DA converter 347 (DA converter <2>) that DA convert digital values respectively outputted from register 342 and register 343 within controller 345 and generate power supply voltage; and DC-DC converter 348; (DC-DC converter <1>) and DC-DC converter 349 (DC-DC converter <2>).

Dividing ratios for the dividing circuit <1> and dividing circuit <2> with respect to the plurality of system clock frequencies are respectively stored as first preset values in memory 142, and power supply voltage preset values for the plurality of system clock frequencies are respectively stored as second preset values.

Control circuit 341 within controller 345 is switched to a power supply voltage measuring mode by the measuring mode switching signal from outside, receives an operation mode signal corresponding to the system clock frequency, outputs frequency-dividing ratio signal 1 and a control signal to frequency-dividing circuit <1> and frequency-dividing ratio signal 2 and a control signal to frequency-dividing circuit <2> based on the first preset value within memory 142, outputs respective control signals to voltage control oscillator circuit 110 and phase comparator/frequency comparator 130 so as to control each section, and compares the phase or frequency of each clock signal. Further, control circuit 341 controls the application of power supply voltages $V_{DM}$ and $V_{SM}$ supplied to voltage control oscillator circuit 110 by setting the count value of up-down counter 143 and register 342 using the second preset value within memory 142.

Control circuit 341 within power supply voltage generating circuit 340 is set to a power supply voltage measuring mode via the measuring mode switching signal, the same power supply voltage control operation as in Embodiment 1 is carried out, power supply voltage convergence values are obtained for all the system clock frequencies, and the second preset value within memory 142 is replaced with the power supply voltage convergence value. Namely, a power supply voltage setting value (power supply voltage convergence value) is stored in memory 142 as the second preset value.

Next, the power supply voltage control circuit is set to a normal operation mode via the measuring mode switching signal, voltage control oscillating circuit 110, phase comparator/frequency comparator 130, and up-down counter 143 are stopped, and power supply voltage setting values corresponding to the respective system clock frequencies of internal circuit block <1> and internal circuit block <2> are read out from memory 142 to register 342 and register 343. DA converter 346 performs DA conversion based on the power supply voltage setting value of register 342, and voltages $V_{D1}$ and $V_{S1}$ are supplied to internal circuit block <1> via DC-DC converter 348. Further, DA converter 347 performs DA conversion based on the power supply voltage preset value of register 343, and voltages $V_{D2}$ and $V_{S2}$ are supplied to internal circuit block <2> via DC-DC converter 349.

At each internal circuit block, after the system clock frequency is switched from a high frequency to a low frequency, or before switched from a low frequency to a high frequency, the corresponding operation mode signal is inputted from the operation mode controller to the control circuit, and control circuit 341 reads out the second preset value within memory 142 corresponding to the operation mode signal as a power supply voltage setting value, and changes the register values of registers 342 and 343. The power supply voltage corresponding to the register value is then applied to each internal circuit block. When the system clock frequency is switched from a low frequency to a high frequency, the system clock frequency at this time is set to a high frequency.

According to this embodiment, power supply voltage generating circuit 340 of power supply voltage control apparatus 300 has a plurality of registers 342 and 343, DA converters 346 and 347, and DC-DC converters 348 and 349. At the time of power supply voltage measuring mode, by obtaining power supply voltage convergence values for all of the system clock frequencies, storing the values as power supply voltage setting values in memory 142, reading out the power supply voltage setting values within memory 142 for each of internal circuit blocks <1> and <2> according to the system clock frequency at the time of normal operating mode, and optimizing the procedure for changing the system clock frequency and changing power supply voltage, it is possible to supply optimum power supply voltage from power supply voltage generating circuit 340.

The above-described explanations are examples of preferred embodiments of the present invention, and by no means limit the scope of the present invention.

Further, the title of "power supply voltage control apparatus" is used in the embodiments but this is merely for simplicity of description, and this may also be "power supply voltage control circuit" etc.

Further, each circuit section configuring the power supply voltage control apparatus, for example, the method for generating the clock signal, the type and the number of flip-flops, and connection method are not limited to the above-described embodiments.

Still further, implementation is possible not only for MOS transistors configured on a normal silicon substrate, but also for semiconductor integrated circuits configured using MOS transistors of an SOI (Silicon On Insulator) structure.

Therefore, the power supply voltage control apparatus of the present invention is capable of, in a power supply voltage control circuit operating at a minimum power supply voltage where normal operation is possible, optimally setting a setting margin of an oscillation frequency of a clock output signal of a voltage control oscillator circuit and a frequency of a system clock signal according to the system clock frequency, and further, converging to a minimum power supply voltage where normal operation is possible in a short period of time without causing errors in operation of an internal circuit upon switching of system clock frequencies. This is extremely effective as a means of implementing low power consumption and continuous stable operation at the same time.

The present invention is not limited to the above-described embodiments, and various variations and modifications may be possible without departing from the scope of the present invention.

This application is based on the Japanese Patent Application No. 2005-312811 filed on Oct. 27, 2005, entire content of which is expressly incorporated by reference herein.

What is claimed is:

1. A power supply voltage control apparatus, comprising:
a voltage control oscillator that generates a clock signal;
a comparator that performs a phase comparison or a frequency comparison between a divided signal of a system clock signal and a divided signal of the clock signal generated by the voltage control oscillator;
a power supply voltage generator that generates a power supply voltage to be supplied to the voltage control oscillator and at least one internal circuit, based on an output of the comparator, the power supply voltage generator comprising:
a preset value storage that stores preset values that are set, by a predetermined value second than respective minimum operation power supply voltages corresponding to a plurality of system clock frequencies;
a controller that, upon switching of a system clock frequency, reads out a preset value stored in the preset value storage, and outputs the read-out preset value as a power supply voltage preset value; and
a digital-to-analog converter that generates the power supply voltage to be supplied to the voltage control oscillator and the at least one internal circuit, based on an output of the controller in addition to the output of the comparator, and
wherein, after the system clock frequency is switched from a first system clock frequency to a second system clock frequency that is lower than the first system clock frequency, the controller reads out a preset value corresponding to the first system clock frequency from the preset value storage, and outputs the read-out preset value as the power supply voltage preset value.

2. A power supply voltage control apparatus, comprising:
a voltage control oscillator that generates a clock signal;
a comparator that performs a phase comparison or a frequency comparison between a divided signal of a system clock signal and a divided signal of the clock signal generated by the voltage control oscillator; and
a power supply voltage generator that generates a power supply voltage to be supplied to the voltage control oscillator and at least one internal circuit, based on an output of the comparator, the power supply voltage generator comprising:
a preset value storage that stores preset values that are set, by a predetermined value second than respective minimum operation power supply voltages corresponding to a plurality of system clock frequencies;
a controller that, upon switching of a system clock frequency, reads out a preset value stored in the preset value storage, and outputs the read-out preset value as a power supply voltage preset value; and
a digital-to-analog converter that generates the power supply voltage to be supplied to the voltage control oscillator and the at least one internal circuit based on an output of the controller in addition to the output of the comparator, and
wherein, before the system clock frequency is switched from a first system clock frequency to a second system clock frequency that is higher than the first system clock frequency, the controller reads out a preset value corresponding to the second system clock frequency from the preset value storage, and outputs the read-out preset value as the power supply voltage preset value.

3. A power supply voltage control apparatus, comprising:
a voltage control oscillator that generates a clock signal;
a comparator that performs a phase comparison or a frequency comparison between a a divided signal of a system clock signal and a divided signal of the clock signal generated by the voltage control oscillator; and
a power supply voltage generator that generates a power supply voltage to be supplied to the voltage control oscillator and at least one internal circuit, based on an output of the comparator, the power supply voltage generator comprising:
a preset value storage that stores preset values that are set, by a predetermined value second than a respective minimum operation power supply voltages corresponding to a plurality of system clock frequencies;
a controller that, upon switching of a system clock frequency, reads out a preset value stored in the preset value storage, and outputs the read-out preset value as a power supply voltage preset value; and
a digital-to-analog converter that generates the power supply voltage to be supplied to the voltage control oscillator and the at least one internal circuit based on an output of the controller, and
wherein the preset value storage replaces a power supply voltage convergence value obtained through a power supply voltage control operation corresponding to a system clock frequency for a previous time, with the stored corresponding preset value, to use as the power supply voltage preset value at a next time of the power supply voltage control operation corresponding to the same system clock frequency.

4. The power supply voltage control apparatus according to claim 3,
wherein the preset value storage stores a power supply voltage value to be used as a preset value when the divided signal of the system clock signal and the divided signal of the clock signal generated by the voltage control oscillator are stable for a fixed period.

5. A power supply voltage control apparatus, comprising:
a voltage control oscillator that generates a clock signal;
a comparator that performs a phase comparison or a frequency comparison between a divided signal of a system clock signal and a divided signal of the clock signal generated by the voltage control oscillator; and
a power supply voltage generator that generates a power supply voltage to be supplied to the voltage control oscillator and at least one internal circuit, based on an output of the comparator, the power supply voltage generator comprising:
a preset value storage that stores preset values that are set, by a predetermined value second than respective minimum operation power supply voltages corresponding to a plurality of system clock frequencies;
a controller that, upon switching of a system clock frequency, reads out a preset value stored in the preset value storage, and outputs the read-out preset value as a power supply voltage preset value; and
a digital-to-analog converter that generates the power supply voltage to be supplied to the voltage control oscillator and the at least one internal circuit, based on an output of the controller,
wherein the controller:
at a time of a power supply voltage measuring mode, measures power supply voltage convergence values for each of the plurality of system clock frequencies, and stores the measured power supply voltage convergence values in the preset value storage as preset as power supply voltage setting values, and, at a time of a normal operation mode, after the system clock frequency is switched from a first system clock frequency to a second system clock frequency that is lower than the first system clock frequency, reads out a preset power supply voltage setting value corresponding to the first system clock frequency from the preset value storage, and outputs the read-out preset power supply voltage setting value as an operation power voltage value, and before the system clock frequency is switched from the second system clock frequency to the first system clock frequency, reads out a preset power supply voltage corresponding to the first system clock frequency from the preset value storage, and outputs the read-out preset power supply voltage setting value as the operation power supply voltage value.

* * * * *